US012743860B2

(12) United States Patent
Lu et al.

(10) Patent No.: US 12,743,860 B2
(45) Date of Patent: Sep. 22, 2026

(54) SYSTEMS AND METHODS FOR PLACEMENT OF VIRTUAL CONTENT OBJECTS IN AN EXTENDED REALITY ENVIRONMENT BASED ON REINFORCEMENT LEARNING

(71) Applicant: JPMORGAN CHASE BANK, N.A., New York, NY (US)

(72) Inventors: Feiyu Lu, New York, NY (US); Mengyu Chen, Los Angeles, CA (US); Hsiang Hsu, Boston, MA (US); Pranav Deshpande, Jersey City, NJ (US); Cheng Yao Wang, Flushing, NY (US); Blair Macintyre, Westwood, MA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 174 days.

(21) Appl. No.: 18/407,003

(22) Filed: Jan. 8, 2024

(65) Prior Publication Data

US 2025/0225749 A1 Jul. 10, 2025

(51) Int. Cl.
*G06T 19/20* (2011.01)
*G06N 3/092* (2023.01)
(Continued)

(52) U.S. Cl.
CPC ............. *G06T 19/20* (2013.01); *G06N 3/092* (2023.01); *G06T 13/40* (2013.01); *G06T 17/20* (2013.01);
(Continued)

(58) Field of Classification Search
CPC ......... G06T 19/20; G06T 13/40; G06T 17/20; G06T 2219/2004; G06T 2210/21; G06N 3/092; G06N 3/006
(Continued)

(56) References Cited

U.S. PATENT DOCUMENTS 11,981,349 B2 * 5/2024 Nister ................. B60W 60/001
12,390,929 B2 * 8/2025 Danielczuk ............ B25J 9/1666
(Continued)

FOREIGN PATENT DOCUMENTS

CN 120371013 A * 7/2025

OTHER PUBLICATIONS

Wang HC, Huang SC, Huang PJ, Wang KL, Teng YC, Ko YT, Jeon D, Wu IC. Curriculum reinforcement learning from avoiding collisions to navigating among movable obstacles in diverse environments. IEEE Robotics and Automation Letters. Mar. 1, 2023;8(5):2740-7.*

(Continued)

*Primary Examiner* — Phu K Nguyen
(74) *Attorney, Agent, or Firm* — GREENBERG TRAURIG LLP

(57) ABSTRACT

In some aspects, the techniques described herein relate to a method including: generating, by a reinforcement learning engine, a plurality of user states within a simulated 3-dimensional environment; generating, by the reinforcement learning engine and for each of the plurality of user states, a plurality of movement actions, wherein each of the plurality of movement actions place a virtual content object in a corresponding position within the simulated 3-dimensional environment; generating, by the reinforcement learning engine and for each corresponding position of the virtual content object, a reward value, wherein the reward value reflects a relative utility of the corresponding position of the virtual content object; and updating, by the reinforcement learning engine, a placement policy based on the reward value for each corresponding position of the virtual content object.

20 Claims, 4 Drawing Sheets

(51) Int. Cl.
*G06T 13/40* (2011.01)
*G06T 17/20* (2006.01)

(52) U.S. Cl.
CPC .. *G06T 2210/21* (2013.01); *G06T 2219/2004* (2013.01)

(58) Field of Classification Search
USPC .......................................................... 345/418
See application file for complete search history.

(56) References Cited

U.S. PATENT DOCUMENTS

| | | | | |
|---|---|---|---|---|
| 2023/0152810 | A1* | 5/2023 | Kharagorgiiev | G05D 1/617 701/25 |
| 2024/0400101 | A1* | 12/2024 | Topan | B60W 60/0015 |
| 2024/0410705 | A1* | 12/2024 | Pham | G06N 3/045 |
| 2025/0108505 | A1* | 4/2025 | Bächer | B25J 9/0081 |
| 2025/0115279 | A1* | 4/2025 | Stein | B60W 60/0015 |
| 2025/0251244 | A1* | 8/2025 | Niewiadomski | G06V 20/588 |

OTHER PUBLICATIONS

Matiisen T, Oliver A, Cohen T, Schulman J. Teacher-student curriculum learning. IEEE transactions on neural networks and learning systems. Sep. 9, 2019;31(9):3732-40.*

Semnani SH, Liu H, Everett M, De Ruiter A, How JP. Multi-agent motion planning for dense and dynamic environments via deep reinforcement learning. IEEE Robotics and Automation Letters. Feb. 18, 2020;5(2):3221-6.*

Liu Z, Chen B, Zhou H, Koushik G, Hebert M, Zhao D. Mapper: Multi-agent path planning with evolutionary reinforcement learning in mixed dynamic environments. In2020 IEEE/RSJ International Conference on Intelligent Robots and Systems (IROS) Oct. 24, 2020 (pp. 11748-11754). IEEE.*

Marchesini E, Farinelli A. Enhancing deep reinforcement learning approaches for multi-robot navigation via single-robot evolutionary policy search. In2022 International Conference on Robotics and Automation (ICRA) May 23, 2022 (pp. 5525-5531). IEEE.*

* cited by examiner

SYSTEMS AND METHODS FOR PLACEMENT OF VIRTUAL CONTENT OBJECTS IN AN EXTENDED REALITY ENVIRONMENT BASED ON REINFORCEMENT LEARNING

BACKGROUND

1. Field of the Invention

Aspects generally relate to systems and methods for placement of virtual content objects in an extended reality environment based on reinforcement learning.

2. Description of the Related Art

Extended reality (XR) enables placement of a virtual content object, which is a virtual object projected into real space, anywhere in the 3-dimensional physical space. For example, a virtual content object may be projected on a wall, above or below a table, in front of or behind a user (i.e., a human), etc. Dynamically determining where to place a virtual content object in 3D space is more complex than determining, e.g., where to place a window on a 2D interface such as a screen. Content placement in XR is a complex problem due to several reasons. For instance, a virtual content object may be freely positioned and rotated anywhere in the unbounded 3D space. Accordingly, the possibility of where and how to place it is theoretically infinite. Moreover, a user will frequently move within the physical 3D space. This causes the user state and environmental states to change frequently and dynamically. Accordingly, the optimal placement of a virtual content object may change dramatically within a relatively short period of time (e.g., only a few seconds) due to the environmental changes. And, since a virtual content object is displayed as if it is a real-world object, users expect the virtual content object to demonstrate realistic and convincing physical behaviors, such as not overlapping with physical objects or moving unexpectedly.

SUMMARY

In some aspects, the techniques described herein relate to a method including: generating, by a reinforcement learning engine, a plurality of user states within a simulated 3-dimensional environment; generating, by the reinforcement learning engine and for each of the plurality of user states, a plurality of movement actions, wherein each of the plurality of movement actions place a virtual content object in a corresponding position within the simulated 3-dimensional environment; generating, by the reinforcement learning engine and for each corresponding position of the virtual content object, a reward value, wherein the reward value reflects a relative utility of the corresponding position of the virtual content object; and updating, by the reinforcement learning engine, a placement policy based on the reward value for each corresponding position of the virtual content object.

In some aspects, the techniques described herein relate to a method, wherein the plurality of movement actions are based on the placement policy.

In some aspects, the techniques described herein relate to a method, wherein the relative utility is determined to be higher when the corresponding position of the virtual content object does not collide with an object mesh within the simulated 3-dimensional environment.

In some aspects, the techniques described herein relate to a method, wherein the relative utility is determined to be higher when the corresponding position of the virtual content object places the virtual content object within a predefined proximity of a virtual human object within the simulated 3-dimensional environment.

In some aspects, the techniques described herein relate to a method, wherein the reward value is a score, and wherein the score is a value within a window that ranges from a lower number to a higher number.

In some aspects, the techniques described herein relate to a method, wherein a value of the score that is below a predefined threshold is determined to be a penalty.

In some aspects, the techniques described herein relate to a method, wherein a relatively higher score reflects a relatively more valuable reward.

In some aspects, the techniques described herein relate to a system including at least one computer including a processor and a memory, wherein the at least one computer is configured to: generate, by a reinforcement learning engine, a plurality of user states within a simulated 3-dimensional environment; generate, by the reinforcement learning engine and for each of the plurality of user states, a plurality of movement actions, wherein each of the plurality of movement actions place a virtual content object in a corresponding position within the simulated 3-dimensional environment; generate, by the reinforcement learning engine and for each corresponding position of the virtual content object, a reward value, wherein the reward value reflects a relative utility of the corresponding position of the virtual content object; and update, by the reinforcement learning engine, a placement policy based on the reward value for each corresponding position of the virtual content object.

In some aspects, the techniques described herein relate to a system, wherein the plurality of movement actions are based on the placement policy.

In some aspects, the techniques described herein relate to a system, wherein the relative utility is determined to be higher when the corresponding position of the virtual content object does not collide with an object mesh within the simulated 3-dimensional environment.

In some aspects, the techniques described herein relate to a system, wherein the relative utility is determined to be higher when the corresponding position of the virtual content object places the virtual content object within a predefined proximity of a virtual human object within the simulated 3-dimensional environment.

In some aspects, the techniques described herein relate to a system, wherein the reward value is a score, and wherein the score is a value within a window that ranges from a lower number to a higher number.

In some aspects, the techniques described herein relate to a system, wherein a value of the score that is below a predefined threshold is determined to be a penalty.

In some aspects, the techniques described herein relate to a system, wherein a relatively higher score reflects a relatively more valuable reward.

In some aspects, the techniques described herein relate to a non-transitory computer readable storage medium, including instructions stored thereon, which instructions, when read and executed by one or more computer processors, cause the one or more computer processors to perform steps including: generating, by a reinforcement learning engine, a plurality of user states within a simulated 3-dimensional environment; generating, by the reinforcement learning engine and for each of the plurality of user states, a plurality of movement actions, wherein each of the plurality of movement actions place a virtual content object in a corresponding position within the simulated 3-dimensional environment; generating, by the reinforcement learning engine and for each corresponding position of the virtual content object, a reward value, wherein the reward value reflects a relative utility of the corresponding position of the virtual content object; and updating, by the reinforcement learning engine, a placement policy based on the reward value for each corresponding position of the virtual content object.

In some aspects, the techniques described herein relate to a non-transitory computer readable storage medium, wherein the plurality of movement actions are based on the placement policy.

In some aspects, the techniques described herein relate to a non-transitory computer readable storage medium, wherein the relative utility is determined to be higher when the corresponding position of the virtual content object does not collide with an object mesh within the simulated 3-dimensional environment.

In some aspects, the techniques described herein relate to a non-transitory computer readable storage medium, wherein the relative utility is determined to be higher when the corresponding position of the virtual content object places the virtual content object within a predefined proximity of a virtual human object within the simulated 3-dimensional environment.

In some aspects, the techniques described herein relate to a non-transitory computer readable storage medium, wherein the reward value is a score, and wherein the score is a value within a window that ranges from a lower number to a higher number.

In some aspects, the techniques described herein relate to a non-transitory computer readable storage medium, wherein a value of the score that is below a predefined threshold is determined to be a penalty, and wherein a relatively higher score reflects a relatively more valuable reward.

DETAILED DESCRIPTION

Figure 1:
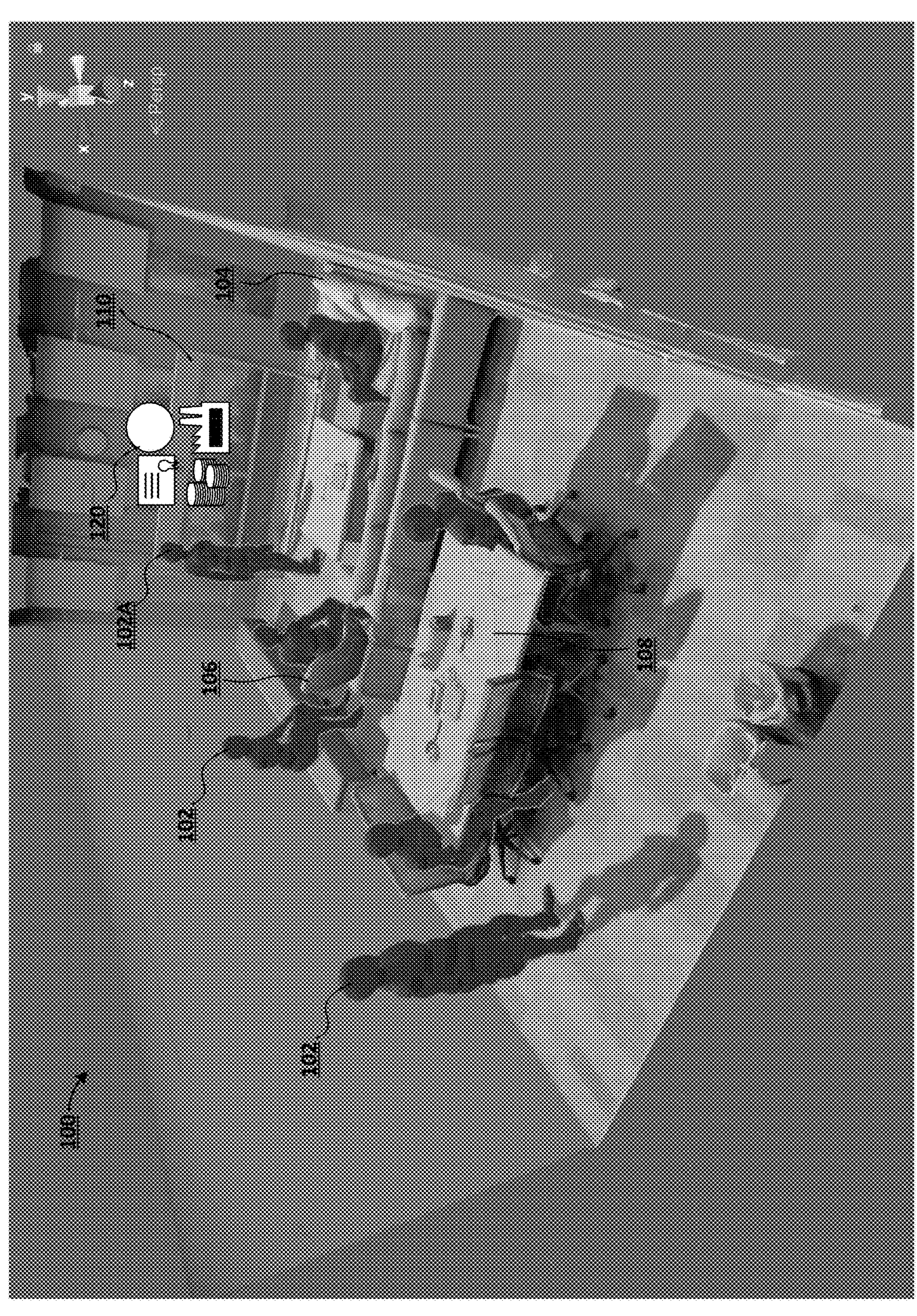
FIG. 1 is an exemplary 3D environment, in accordance with aspects.

Aspects generally relate to systems and methods for placement of virtual content objects in an extended reality environment based on reinforcement learning.

Aspects may employ reinforcement learning to determine appropriate placement of a virtual content object in an extended reality environment. A 3-dimensional (3D) physical environment may be simulated including various objects and random user states. An agent model may explore various placement options of a virtual content object within the 3D environment. A reinforcement learning engine may be configured to maximize the utility of the placement of the virtual content object with respect to a user through reinforcement learning algorithms that train an agent model on acceptable placement of a virtual content object.

The term "reinforcement learning" (RL) refers to a type of machine learning algorithm that enables a machine learning model (e.g., an "agent model") to learn in an interactive environment through trial and error using feedback based on the agent model's own actions and experiences in the interactive environment. Aspects described herein apply reinforcement learning techniques to optimize the utility and/or desirability of placement of a virtual content object by an agent model within a 3D environment. An agent model may learn acceptable placement of a virtual content object within a 3D extended reality environment based on a reward system. Through extensive trial and error and trail and reward mechanisms, the agent model may gradually learn an optimal position policy (e.g., a number of acceptable positions for a virtual content object with respect to other objects), where the position policy orients the virtual content object within the 3D environment to maximize the virtual content object's utility for users of the environment.

There are many terms that describe either virtual or semi virtual environments. For instance, augmented reality (AR) is often used to describe an interactive experience that combines the physical world and computer-generated virtual content. In AR, virtual content is usually registered and displayed on top of the physical environment. Virtual reality (VR) may be used to describe a simulated experience that completely immerses a user inside a computer-generated virtual environment. Mixed reality (MR) may be used to describe a mixture of the physical real-world environment and computer-generated virtual content. Extended reality (XR), as used herein, includes the definitions of augmented reality, mixed reality, and virtual reality.

In exemplary XR environments, a user may wear a head-mounted display that renders either stereoscopic 3D environments in front of the user's eyes or includes a transparent lens/screen that allows a user to see through the screen to a physical environment but also see one or more virtual content objects generated on the screen, thereby providing the illusion that the virtual content object is present in the physical environment. The techniques described herein may be applied in various extended reality scenarios, particularly assuming a need for continuously determining optimal placement of a virtual content object. The described techniques may be applied broadly to XR use cases (i.e., AR, MR, and VR) when placements of any virtual content need to be optimized in a 3D environment, with and without the presence of a real-world environment.

As used herein, the term "virtual content object" includes a simulated virtual object that is displayed in an extended reality (XR) environment. A virtual content object may be a virtual object that a user may interact with. A virtual content object may also be programmatically moved or repositioned within a 3D environment and may be positioned such that it appears that the virtual content object is resting on a table or the floor, affixed to a wall, etc. Exemplary virtual content objects may include virtual objects such as virtual maps, virtual presentations, virtual graphics, virtual gameboards, virtual graphics, and other virtual content that can be drawn or projected within a 3D environment.

As used herein, the term "3D environment" refers to a representation (i.e., a simulation) of a real or generated 3-dimensional space where a virtual content object may be projected, positioned, etc. An exemplary simulated 3D environment may include a scanned replication of any physical environment, such as an office space, including realistic furniture and other objects having realistic textures and other qualities. Objects may be represented by a segmented mesh, and object meshes may be semantically categorized. Some or all of a replica dataset may be captured by a scanning device (e.g., a headset that includes scanning equipment and that is worn by a human user). A scanning device may be used to capture data and generate a simulated 3D environment of a real space, such as an office space, that includes real furniture and other objects. In some aspects, a 3D environment may be generated by arrangement of mesh object data that represents walls, floors, ceilings, furniture, etc., into a 3D environment that resembles a real-world space. A 3D environment may be a training environment for the techniques described herein.

In accordance with aspects, a 3D environment may include several generated virtual human objects (VHOs) that may represent a human within the 3D environment. The VHOs may be generated such that they take up a space in the 3D environment similar to a space that would be occupied by a real human (i.e., a VHO may have legs, arms, a torso, a head, etc., that, combined, comprise the VHO, and that occupy a space proportionate to that space a real human would occupy). The several VHOs may be placed at various positions in the 3D environment. These positions may reflect common or customary positions that a real human may take in a physical room having dimensions and objects the same or similar to the 3D environment that that VHOs are in. As used herein, the term "user state" refers to a position of a VHO within a 3D environment.

Exemplary user states of a VHO include standing in an open area (i.e., not close to another object), standing in front of a whiteboard object, standing in front of a table object, sitting on a sofa object, sitting by a table object, sitting but with no other objects near, etc. Other user states may be included as is necessary or desired.

In accordance with aspects, a 3D environment may act as a training environment for an agent model of a reinforcement learning engine. An agent model may be a machine learning (ML) model such as a neural network. A 3D environment may have operative access to a 3D environment. For instance, a 3D environment may be loaded into a memory of a reinforcement learning engine such that an agent model is in operative communication with, or has operative access to, the 3D environment. An agent model may observe the 3D environment and environmental states, including user states, of the 3D environment. Multiple positions of a virtual content object may be generated, and the positions may each be critiqued with respect to their utility.

In an exemplary aspect, an action engine may generate positions for a virtual content object within a 3D environment and with respect to a user state and object meshes within the 3D environment. In accordance with aspects, an action engine may observe an absolute position and orientation of a virtual content object. The action engine may further observe where a user or a virtual human object is located and where other object meshes (couches, table, chairs, etc.) are located within the bounds of the 3D environment. The action engine may also determine a relative placement of the virtual content object with respect to a human user or VHO and other object meshes including the virtual content object's distance to the environment meshes, distance to the human or VHO, and position relative to a face and/or eyesight of the VHO.

In accordance with aspects, an action engine may then generate a movement action in a given frame, where a frame includes the 3D environment and a particular user state. A movement action may include a 3D force vector that is applied to a virtual content object and that moves the virtual content object according to the 3D force vector within the 3D environment. A movement action may be based on several parameters. Exemplary parameters that may define or influence a movement action may include a distance from a VHO, a facing direction of a VHO, a rotation of the virtual content object, a distance to environment object meshes, a velocity vector, an absolute position in the 3D environment (as measured by, e.g., ray sensors form the virtual content object), and any other necessary or desirable parameters). Parameter values may be collected in and received from a placement policy that is maintained by an agent model. A placement policy may be updated and refined based on a reinforcement learning procedure, as described herein.

In an exemplary aspect, an action engine may generate a movement action that will place a virtual content object in a position that maximizes utility of the virtual content object with respect to the VHO user state reflected by a given from. Utility of virtual content object may be defined by a number of parameters. For instance, maximum utility may be considered a position of a virtual content object that is within reach (i.e., within an arm's length) of a VHO in a given user state, that is visible without occluding important information or being occluded, that is in front of (i.e., in view of) a VHO in a given user state, and that does not collide with or overlap with an object mesh of the 3D environment. That is, an action engine may generate movement actions such that, as a user state changes with respect to a surrounding 3D environment, the position of a virtual content object is continuously maintained so that the virtual content object is visible and reachable to the user while avoiding collisions with objects in the 3D environment.

Aspects may execute a simulation based on the 3D environment. A simulation may include various stages where in each stage a VHO is positioned in a possible user state. Aspects may generate a movement action that positions a virtual content object in a position within the 3D environment, where the position of the virtual content object seeks to maximize utility of the virtual content object. Aspects may generate various movement actions for each user state in a simulation in order to find positions with respect to environment objects that maximize the utility of a virtual content object. That is, the simulation may generate several placement options of a virtual content object for each of a VHO standing in an open area, a VHO sitting at a table, a VHO sitting on a couch, and for other user states reflected by a VHO in the 3D environment.

The simulation may move a virtual content item into different space within the 3D environment by applying a 3D force to the virtual content item. A critique engine may observe a generated position of a virtual content object with respect to a user and may provide critiques of each position in the form of a reward or a penalty assigned to each action. That is, for each position generated by an action engine, a critique engine may assess the movement action and the position specified by the movement action, and assign either a reward or a penalty to the movement action, the position, or both.

For instance, a movement action may be assigned a reward for a velocity vector that moves a virtual content object at a speed and/or direction that keeps the virtual content object within a defined distance, and in front of, a VHO in a particular user state. On the other hand, a penalty may be assigned if the movement action does not keep the virtual content object in front of the VHO of does not assign a velocity vector that is sufficient to consistently keep the virtual content object in front of the VHO.

Moreover, the critique engine may assign a reward for a position assigned by a movement action that keeps the virtual content object from colliding or overlapping with an object mesh within the 3D environment, or that keeps the virtual content object from moving outside of a wall, or behind an object mesh that would obstruct visibility of the virtual content object. Similarly, the critique engine may assign a penalty to a movement action that would result in a collision or limited view of the virtual content object.

The critique engine may provide the reward or the penalty for each movement action generated by the action engine to an agent model. The agent model may maintain a placement policy that is continually refined through a reinforcement learning process. For each movement action and associated position, the critique engine may provide either a reward or a penalty to the agent model, and the agent model may update a placement policy based on the reward or the penalty. For instance, a placement policy of the agent model may be updated to include a velocity vector and a position for which a reward was issued by a critique engine. On the other hand, an agent model may update a placement policy by removing a velocity vector or a position for which a penalty was received. A reward may be provided as a score, where a relatively high score is considered a valuable reward, and a relatively low score is considered less valuable or considered a penalty. In this way, a placement policy that only or primarily contains movement actions for which highly valuable rewards were issued will eventually be generated and maintained by the agent model. In other words, the agent model is trained to only maintain movement instructions within a placement policy that moves a virtual content object in ways and to areas for which a highly valuable (i.e., a high-scoring) reward is provided, and to avoid movement/placement of a virtual content object in ways/areas where a reward is lower (i.e., a low-scoring reward) for the placement.

The reinforcement learning process described herein may be carried out for each step of a simulation, which may be comprised of multiple simulation frames. A total number of simulation steps may vary depending on the complexity of a training configuration. Accordingly, for each user state of a VHO that is included in a step, the reinforcement learning process is carried out. Many user states may be randomly generated, and corresponding steps may be processed in a simulation.

FIG. 1 is an exemplary 3D environment, in accordance with aspects. A 3D environment which may be used with the techniques described herein may comprise a replica dataset, such as the replica datasets described in *The Replica Dataset: A Digital Replica of Indoor Spaces* by Straub et al., the disclosure of which is incorporated herein by reference. 3D environment 100 includes virtual human object (VHO) 102 in a variety of user states. For instance, VHO 102 is shown standing, sitting at a table, sitting on a bench, standing close to a whiteboard, sitting on a couch, etc. FIG. 1 also depicts several object meshes. For instance, object mesh 104 represents a couch in the 3D environment. Object mesh 106 represents a chair in the 3D environment. Object mesh 108 represents a table in the 3D environment. Each user state depicted in 3D environment 100 may be used in a frame of a simulation.

In accordance with aspects, VHO 102A is depicted in a user state that is standing close to object mesh 110 which represents a whiteboard in 3D environment 100. Moreover, virtual content object 120 is shown positioned in front of VHO 102A and between object mesh 104 and VHO 102A. The user state depicted by VHO 102A may be part of a simulation stage for which an action engine has generated the position of virtual content object 120. A critique engine may observe the position of virtual content object 120 and may determine that the position (and any force vector that was applied to move virtual content object 120 to the position) optimizes the utility of virtual content object 120 with respect to VHO 102A. Accordingly, the critique engine may issue a reward for the position, velocity vector, and/or the movement action that placed virtual content object 120 in the position. An agent model may update a placement policy based on the issued reward.

Figure 2:
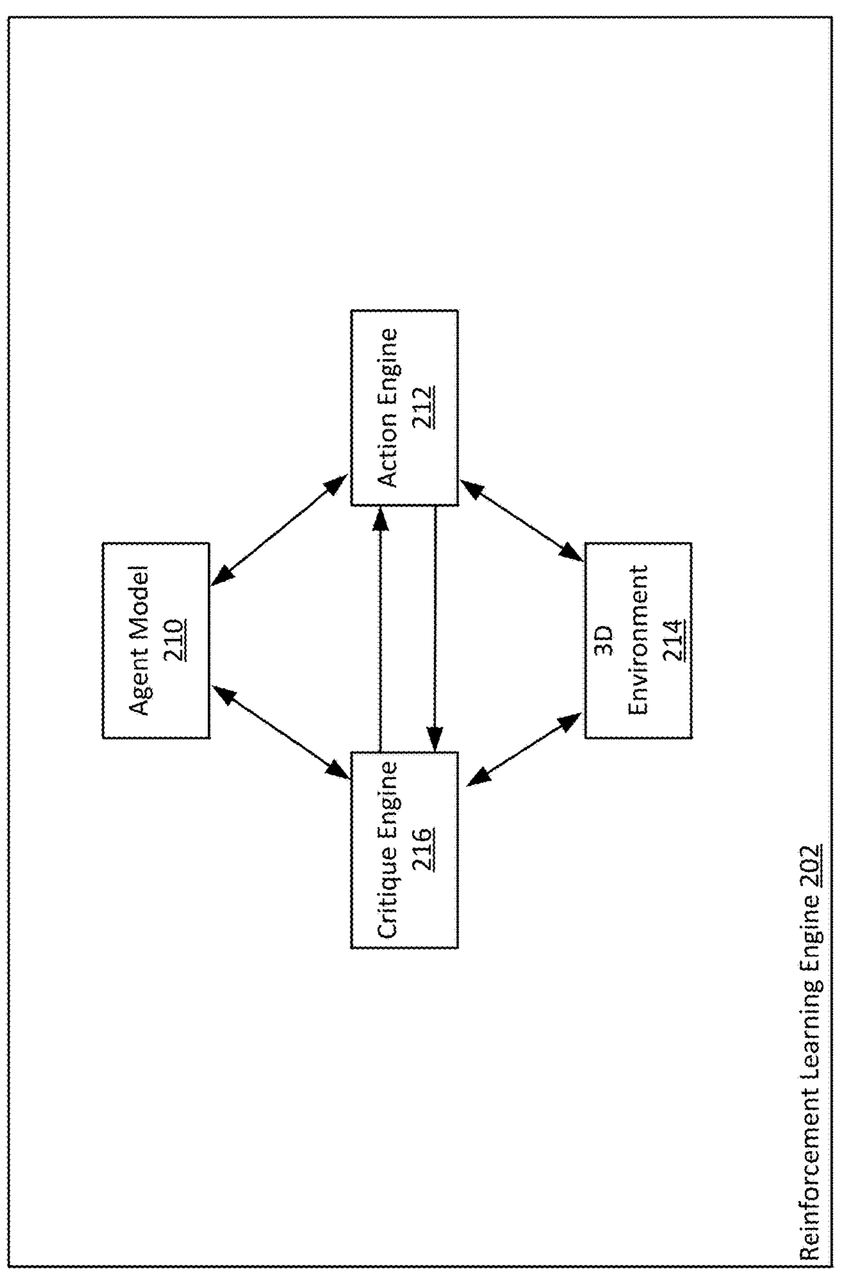
FIG. 2 is a block diagram of a system for placement of virtual content objects in an extended reality environment based on reinforcement learning, in accordance with aspects.

FIG. 2 is a block diagram of a system for placement of virtual content objects in an extended reality environment based on reinforcement learning, in accordance with aspects. System 200 includes reinforcement learning engine 202. Reinforcement learning engine 202 includes agent model 210, action engine 212, 3D environment 214, and critique engine 216. In accordance with aspects, 3D environment 214 may be a 3D environment as described herein. 3D environment 214 may be a simulated environment including object meshes and in which user states of a VHO may be simulated.

Reinforcement learning engine 202 may execute a simulation in which several users states of a VHO within 3D environment 214 are simulated. A user state may be randomly generated during a simulation, which may be adequately sampled in the 3D environment to make sure possible user states are well-represented. For each user state represented in the simulation, action engine 212 may continuously generate movement actions that move a virtual content object to a position in 3D environment 214. The movement actions may attempt to maximize the utility of the virtual content object with respect to the corresponding user state.

For each movement action and/or resultant position, critique engine 216 may issue a reward or a penalty based on the criteria described herein. In various aspects, a penalty may be a low-value reward (e.g., a reward having a score that is below a designated threshold) or the absence of an issued reward. In some aspects, a reward may be a high-value reward (e.g., a reward that is above a threshold score, where the higher the reward score is above the threshold, the more “valuable” the reward is) or the absence of an issued penalty. In other aspects an express (e.g., a binary) reward or penalty may be issued. Critique engine 216 may issue the reward or penalty to agent model 210. Upon receiving the reward or penalty, agent model 210 may update a placement policy based on the reward scheme. For instance, a movement action and/or position may be added to or maintained in a placement policy based on the issuance of a reward with respect to the movement action or resultant position of the virtual content object. Additionally, a movement action and/or position may be removed or not added to a placement policy based on a penalty issued with respect to the placement policy/position.

Action engine 212 may base generated movement actions on the placement policy of agent model 210. The process of generating a movement action for placement of a virtual content object in 3D environment 214, issuing a reward or a penalty for the movement action/position by critique engine 216, and updating a placement policy by agent model 210 may continue for each step of a simulation. There may be as many steps (and consequently, as many user states) as is necessary or desired in a simulation.

Figure 3:
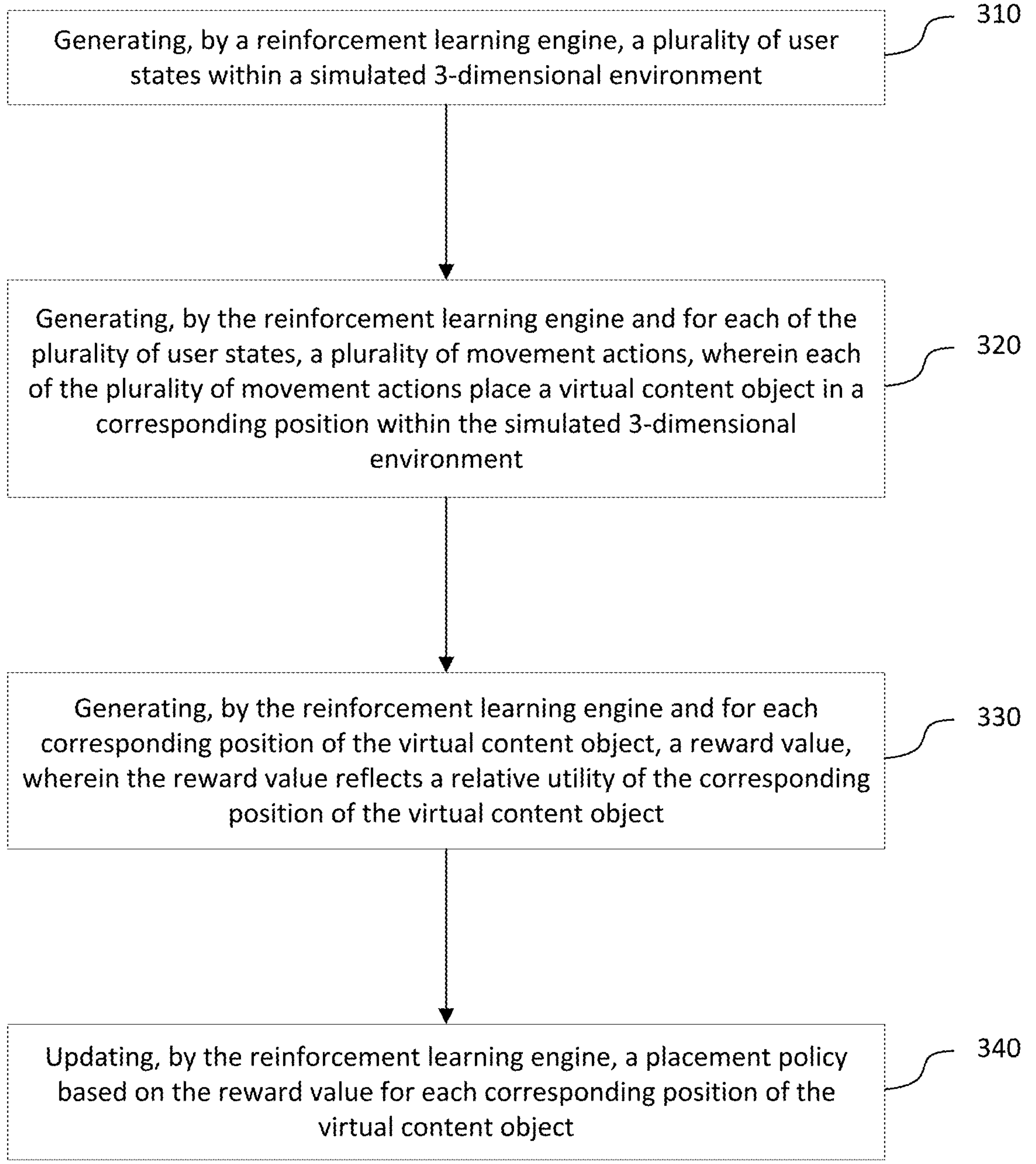
FIG. 3 is a logical flow for placement of virtual content objects in an extended reality environment based on reinforcement learning, in accordance with aspects.

FIG. 3 is a logical flow for placement of virtual content objects in an extended reality environment based on reinforcement learning, in accordance with aspects.

Step 310 includes generating, by a reinforcement learning engine, a plurality of user states within a simulated 3-dimensional environment.

Step 320 includes generating, by the reinforcement learning engine and for each of the plurality of user states, a plurality of movement actions, wherein each of the plurality of movement actions place a virtual content object in a corresponding position within the simulated 3-dimensional environment.

Step 330 includes generating, by the reinforcement learning engine and for each corresponding position of the virtual content object, a reward value, wherein the reward value reflects a relative utility of the corresponding position of the virtual content object.

Step 340 includes updating, by the reinforcement learning engine, a placement policy based on the reward value for each corresponding position of the virtual content object.

Figure 4:
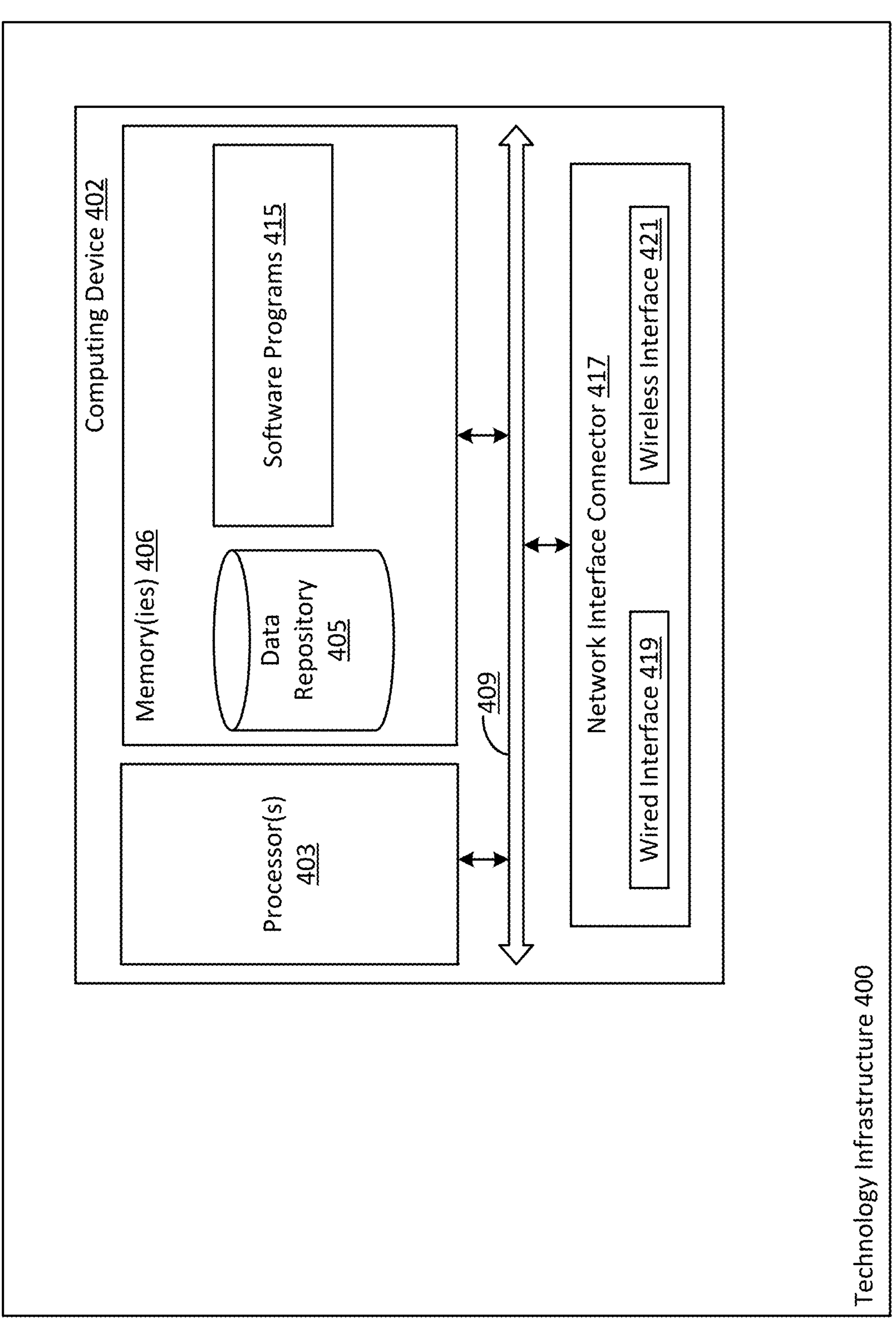
FIG. 4 is a block diagram of a technology infrastructure and computing device for implementing certain aspects of the present disclosure, in accordance with aspects.

FIG. 4 is a block diagram of a technology infrastructure and computing device for implementing certain aspects of the present disclosure, in accordance with aspects. FIG. 4 includes technology infrastructure 400. Technology infrastructure 400 represents the technology infrastructure of an implementing organization. Technology infrastructure 400 may include hardware such as servers, client devices, and other computers or processing devices. Technology infrastructure 400 may include software (e.g., computer) applications that execute on computers and other processing devices. Technology infrastructure 400 may include computer network mediums, and computer networking hardware and software for providing operative communication between computers, processing devices, software applications, procedures and processes, and logical flows and steps, as described herein.

Exemplary hardware and software that may be implemented in combination where software (such as a computer application) executes on hardware. For instance, technology infrastructure 400 may include webservers, application servers, database servers and database engines, communication servers such as email servers and SMS servers, client devices, etc. The term "service" as used herein may include software that, when executed, receives client service requests and responds to client service requests with data and/or processing procedures. A software service may be a commercially available computer application or may be a custom-developed and/or proprietary computer application. A service may execute on a server. The term "server" may include hardware (e.g., a computer including a processor and a memory) that is configured to execute service software. A server may include an operating system optimized for executing services. A service may be a part of, included with, or tightly integrated with a server operating system. A server may include a network interface connection for interfacing with a computer network to facilitate operative communication between client devices and client software, and/or other servers and services that execute thereon.

Server hardware may be virtually allocated to a server operating system and/or service software through virtualization environments, such that the server operating system or service software shares hardware resources such as one or more processors, memories, system buses, network interfaces, or other physical hardware resources. A server operating system and/or service software may execute in virtualized hardware environments, such as virtualized operating system environments, application containers, or any other suitable method for hardware environment virtualization.

Technology infrastructure 400 may also include client devices. A client device may be a computer or other processing device including a processor and a memory that stores client computer software and is configured to execute client software. Client software is software configured for execution on a client device. Client software may be configured as a client of a service. For example, client software may make requests to one or more services for data and/or processing of data. Client software may receive data from, e.g., a service, and may execute additional processing, computations, or logical steps with the received data. Client software may be configured with a graphical user interface such that a user of a client device may interact with client computer software that executes thereon. An interface of client software may facilitate user interaction, such as data entry, data manipulation, etc., for a user of a client device.

A client device may be a mobile device, such as a smart phone, tablet computer, or laptop computer. A client device may also be a desktop computer, or any electronic device that is capable of storing and executing a computer application (e.g., a mobile application). A client device may include a network interface connector for interfacing with a public or private network and for operative communication with other devices, computers, servers, etc., on a public or private network.

Technology infrastructure 400 includes network routers, switches, and firewalls, which may comprise hardware, software, and/or firmware that facilitates transmission of data across a network medium. Routers, switches, and firewalls may include physical ports for accepting physical network medium (generally, a type of cable or wire—e.g., copper or fiber optic wire/cable) that forms a physical computer network. Routers, switches, and firewalls may also have "wireless" interfaces that facilitate data transmissions via radio waves. A computer network included in technology infrastructure 400 may include both wired and wireless components and interfaces and may interface with servers and other hardware via either wired or wireless communications. A computer network of technology infrastructure 400 may be a private network but may interface with a public network (such as the internet) to facilitate operative communication between computers executing on technology infrastructure 400 and computers executing outside of technology infrastructure 400.

FIG. 4 further depicts exemplary computing device 402. Computing device 402 depicts exemplary hardware that executes the logic that drives the various system components described herein. Servers and client devices may take the form of computing device 402. While shown as internal to technology infrastructure 400, computing device 402 may be external to technology infrastructure 400 and may be in operative communication with a computing device internal to technology infrastructure 400.

In accordance with aspects, system components such as a reinforcement learning engine, an agent model, an action engine, a simulated 3D environment, a critique engine, client devices, servers, various database engines and database services, and other computer applications and logic may include, and/or execute on, components and configurations the same, or similar to, computing device 402.

Computing device 402 includes a processor 403 coupled to a memory 406. Memory 406 may include volatile memory and/or persistent memory. The processor 403 executes computer-executable program code stored in memory 406, such as software programs 415. Software programs 415 may include one or more of the logical steps disclosed herein as a programmatic instruction, which can be executed by processor 403. Memory 406 may also include data repository 405, which may be nonvolatile memory for data persistence. The processor 403 and the memory 406 may be coupled by a bus 409. In some examples, the bus 409 may also be coupled to one or more network interface connectors 417, such as wired network interface 419, and/or wireless network interface 421. Computing device 402 may also have user interface components, such as a screen for displaying graphical user interfaces and receiving input from the user, a mouse, a keyboard and/or other input/output components (not shown).

In accordance with aspects, services, modules, engines, etc., described herein may provide one or more application programming interfaces (APIs) in order to facilitate communication with related/provided computer applications and/or among various public or partner technology infrastructures, data centers, or the like. APIs may publish various methods and expose the methods, e.g., via API gateways. A published API method may be called by an application that is authorized to access the published API method. API methods may take data as one or more parameters or arguments of the called method. In some aspects, API access may be governed by an API gateway associated with a corresponding API. In some aspects, incoming API method calls may be routed to an API gateway and the API gateway may forward the method calls to internal services/modules/engines that publish the API and its associated methods.

A service/module/engine that publishes an API may execute a called API method, perform processing on any data received as parameters of the called method, and send a return communication to the method caller (e.g., via an API gateway). A return communication may also include data based on the called method, the method's data parameters and any performed processing associated with the called method.

API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

The various processing steps, logical steps, and/or data flows depicted in the figures and described in greater detail herein may be accomplished using some or all of the system components also described herein. In some implementations, the described logical steps or flows may be performed in different sequences and various steps may be omitted. Additional steps may be performed along with some, or all of the steps shown in the depicted logical flow diagrams. Some steps may be performed simultaneously. Some steps may be performed using different system components. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing device," a "computing device," a "computer," an "electronic device," a "mobile device," a "client device," a "server," etc. As used herein, these terms (unless otherwise specified) are to be understood to include at least one processor that uses at least one memory. The at least one memory may store a set of instructions. The instructions may be either permanently or temporarily stored in the memory or memories of the processing device. The processor executes the instructions that are stored in the memory or memories in order to process data. A set of instructions may include various instructions that perform a particular step, steps, task, or tasks, such as those steps/tasks described above, including any logical steps or logical flows described above. Such a set of instructions for performing a particular task may be characterized herein as an application, computer application, program, software program, service, or simply as "software." In one aspect, a processing device may be or include a specialized processor. As used herein (unless otherwise indicated), the terms "module," and "engine" refer to a computer application that executes on hardware such as a server, a client device, etc. A module or engine may be a service.

As noted above, the processing device executes the instructions that are stored in the memory or memories to process data. This processing of data may be in response to commands by a user or users of the processing device, in response to previous processing, in response to a request by another processing device and/or any other input, for example. The processing device used to implement the invention may utilize a suitable operating system, and instructions may come directly or indirectly from the operating system.

The processing device used to implement the invention may be a general-purpose computer. However, the processing device described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing device be physically located in the same geographical place. That is, each of the processors and the memories used by the processing device may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing device what to do with the data being processed.

Further, it is appreciated that the instructions or set of instructions used in the implementation and operation of the invention may be in a suitable form such that the processing device may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing device, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing device, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing device, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing device that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing device or machines that are used to implement the invention. As used herein, a user interface includes any hardware, software, or combination of hardware and software used by the processing device that allows a user to interact with the processing device. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing device as it processes a set of instructions and/or provides the processing device with information. Accordingly, the user interface is any device that provides communication between a user and a processing device. The information provided by the user to the processing device through the user interface may be in the form of a command, a selection of data, or some other input, for example.

As discussed above, a user interface is utilized by the processing device that performs a set of instructions such that the processing device processes data for a user. The user interface is typically used by the processing device for interacting with a user either to convey information or receive information from the user. However, it should be appreciated that in accordance with some aspects of the system and method of the invention, it is not necessary that a human user actually interact with a user interface used by the processing device of the invention. Rather, it is also contemplated that the user interface of the invention might interact, i.e., convey and receive information, with another processing device, rather than a human user. Accordingly, the other processing device might be characterized as a user. Further, it is contemplated that a user interface utilized in the system and method of the invention may interact partially with another processing device or processing devices, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:

generating, by a reinforcement learning engine, a virtual human object within a simulated 3-dimensional environment, wherein the virtual human object represents a human within the simulated 3-dimensional environment;

generating, by the reinforcement learning engine, a plurality of movement and orientation actions, wherein each of the plurality of movement actions and orientation place a virtual content object in a corresponding position within the simulated 3-dimensional environment, wherein the virtual content object is configured to interact with the virtual human object;

issuing, by the reinforcement learning engine and for each corresponding position and orientation of the virtual content object, a reward or a penalty, wherein the reward and the penalty reflect a relative utility of the corresponding position and orientation of the virtual content object for the interaction with the virtual human object; and updating, by the reinforcement learning engine, a placement policy based on the reward or the penalty for each corresponding position and orientation of the virtual content object.

2. The method of claim 1, wherein the plurality of movement and orientation actions are based on the placement policy.

3. The method of claim 1, wherein the relative utility is determined to be higher when the corresponding position and orientation of the virtual content object does not collide with an object mesh within the simulated 3-dimensional environment.

4. The method of claim 1, wherein the relative utility is determined to be higher when the corresponding position and orientation of the virtual content object places the virtual content object within a predefined proximity of a virtual human object within the simulated 3-dimensional environment.

5. The method of claim 1, wherein the reward or the penalty comprises a score, and wherein the score is a value within a window that ranges from a lower number to a higher number.

6. The method of claim 5, wherein a value of the score that is below a predefined threshold is determined to be a penalty.

7. The method of claim 5, wherein a relatively higher score reflects a relatively more valuable reward.

8. A system comprising at least one computer including a processor and a memory, wherein the at least one computer is configured to:

generate, by a reinforcement learning engine, a virtual human object within a simulated 3-dimensional environment, wherein the virtual human object represents a human within the simulated 3-dimensional environment;

generate, by the reinforcement learning engine, a plurality of movement and orientation actions, wherein each of the plurality of movement actions and orientation place a virtual content object in a corresponding position within the simulated 3-dimensional environment, wherein the virtual content object is configured to interact with the virtual human object;

issue, by the reinforcement learning engine and for each corresponding position and orientation of the virtual content object, a reward or a penalty, wherein the reward and the penalty reflect a relative utility of the corresponding position and orientation of the virtual content object for the interaction with the virtual human object; and update, by the reinforcement learning engine, a placement policy based on the reward or the penalty for each corresponding position and orientation of the virtual content object.

9. The system of claim 8, wherein the plurality of movement and orientation actions are based on the placement policy.

10. The system of claim 8, wherein the relative utility is determined to be higher when the corresponding position and orientation of the virtual content object does not collide with an object mesh within the simulated 3-dimensional environment.

11. The system of claim 8, wherein the relative utility is determined to be higher when the corresponding position and orientation of the virtual content object places the virtual content object within a predefined proximity of a virtual human object within the simulated 3-dimensional environment.

12. The system of claim 8, wherein the reward or the penalty comprises a score, and wherein the score is a value within a window that ranges from a lower number to a higher number.

13. The system of claim 12, wherein a value of the score that is below a predefined threshold is determined to be a penalty.

14. The system of claim 12, wherein a relatively higher score reflects a relatively more valuable reward.

15. A non-transitory computer readable storage medium, including instructions stored thereon, which instructions, when read and executed by one or more computer processors, cause the one or more computer processors to perform steps comprising:

generating, by a reinforcement learning engine, a virtual human object within a simulated 3-dimensional environment, wherein the virtual human object represents a human within the simulated 3-dimensional environment;

generating, by the reinforcement learning engine, a plurality of movement and orientation actions, wherein each of the plurality of movement actions and orientation place a virtual content object in a corresponding position within the simulated 3-dimensional environment, wherein the virtual content object is configured to interact with the virtual human object;

issuing, by the reinforcement learning engine and for each corresponding position and orientation of the virtual content object, a reward or a penalty, wherein the reward and the penalty reflect a relative utility of the corresponding position and orientation of the virtual content object for the interaction with the virtual human object; and updating, by the reinforcement learning engine, a placement policy based on the reward or the penalty for each corresponding position and orientation of the virtual content object.

16. The non-transitory computer readable storage medium of claim 15, wherein the plurality of movement and orientation actions are based on the placement policy.

17. The non-transitory computer readable storage medium of claim 15, wherein the relative utility is determined to be higher when the corresponding position and orientation of the virtual content object does not collide with an object mesh within the simulated 3-dimensional environment.

18. The non-transitory computer readable storage medium of claim 15, wherein the relative utility is determined to be higher when the corresponding position and orientation of the virtual content object places the virtual content object within a predefined proximity of a virtual human object within the simulated 3-dimensional environment.

19. The non-transitory computer readable storage medium of claim 15, wherein the reward or the penalty comprises a score, and wherein the score is a value within a window that ranges from a lower number to a higher number.

20. The non-transitory computer readable storage medium of claim 19, wherein a value of the score that is below a predefined threshold is determined to be a penalty, and wherein a relatively higher score reflects a relatively more valuable reward.

* * * * *